United States Patent [19]
Moiin et al.

[11] Patent Number: 5,948,109
[45] Date of Patent: Sep. 7, 1999

[54] QUORUM MECHANISM IN A TWO-NODE DISTRIBUTED COMPUTER SYSTEM

[75] Inventors: Hossein Moiin, San Francisco; Ottalingam T. Satyanarayanan, Fremont; Angelo Pruscino, Mountain View, all of Calif.

[73] Assignee: Sun Microsystems, Inc., Palo Alto, Calif.

[21] Appl. No.: 09/115,412

[22] Filed: Jul. 14, 1998

Related U.S. Application Data

[63] Continuation of application No. 08/656,386, May 31, 1996, Pat. No. 5,828,889.

[51] Int. Cl.$^6$ ................................................ G06F 11/18
[52] U.S. Cl. ............................................. 714/4; 710/240
[58] Field of Search ..................... 395/182.02, 182.07, 395/182.09, 200.43, 728, 726, 727; 711/150, 151

[56] References Cited

U.S. PATENT DOCUMENTS

| | | | |
|---|---|---|---|
| 4,709,325 | 11/1987 | Yajima | 364/200 |
| 5,408,629 | 4/1995 | Tsuchiya et al. | 395/425 |
| 5,463,733 | 10/1995 | Forman et al. | 395/182.08 |
| 5,469,575 | 11/1995 | Madduri | 395/200.03 |
| 5,673,384 | 9/1997 | Hepner et al. | 395/182.09 |
| 5,828,889 | 10/1998 | Moiin et al. | 395/728 |

FOREIGN PATENT DOCUMENTS

| | | | |
|---|---|---|---|
| 0 033 915 A1 | 8/1981 | European Pat. Off. | G06F 13/00 |
| 0 537 899 A1 | 4/1993 | European Pat. Off. | G06F 9/46 |
| 0 595 453 A1 | 5/1994 | European Pat. Off. | G06F 9/46 |

*Primary Examiner*—Robert W. Beausoliel, Jr.
*Assistant Examiner*—Scott T. Baderman
*Attorney, Agent, or Firm*—James D. Ivey

[57] ABSTRACT

Each node of a failing distributed computer system, e.g., as a result of a split-brain failure, races to achieve a quorum by successfully reserving two shared storage devices which are designated quorum controllers. During normal operation of the distributed computer system, each of the quorum controllers is associated with and reserved by a respective node. During the race for quorum in response to a detected failure of the distributed computer system, each node which has not failed forcibly reserves the quorum controller which is associated with the other node. If a node simultaneously holds reservations for both quorum controllers, that node has acquired a quorum. The forcible reservation of a shared storage device does not fail even if another node holds a valid reservation to the same storage device. Accordingly, a failed node which does not relinquish a reservation to the node's quorum controller cannot prevent another node from acquiring a quorum. Prior to forcibly reserving the quorum controller of another node, each node verifies that it continues to hold a reservation of the node's own associated quorum controller. If a node no longer holds a reservation of the node's own associated quorum controller, that node has lost the race for quorum since another node has already forcibly reserved the former node's associated quorum controller. Thus, quorum can be efficiently and effectively determined by independent nodes of a failing distributed computer system notwithstanding the failure of a failing node to relinquish shared storage device reservations held by the failing node.

5 Claims, 7 Drawing Sheets

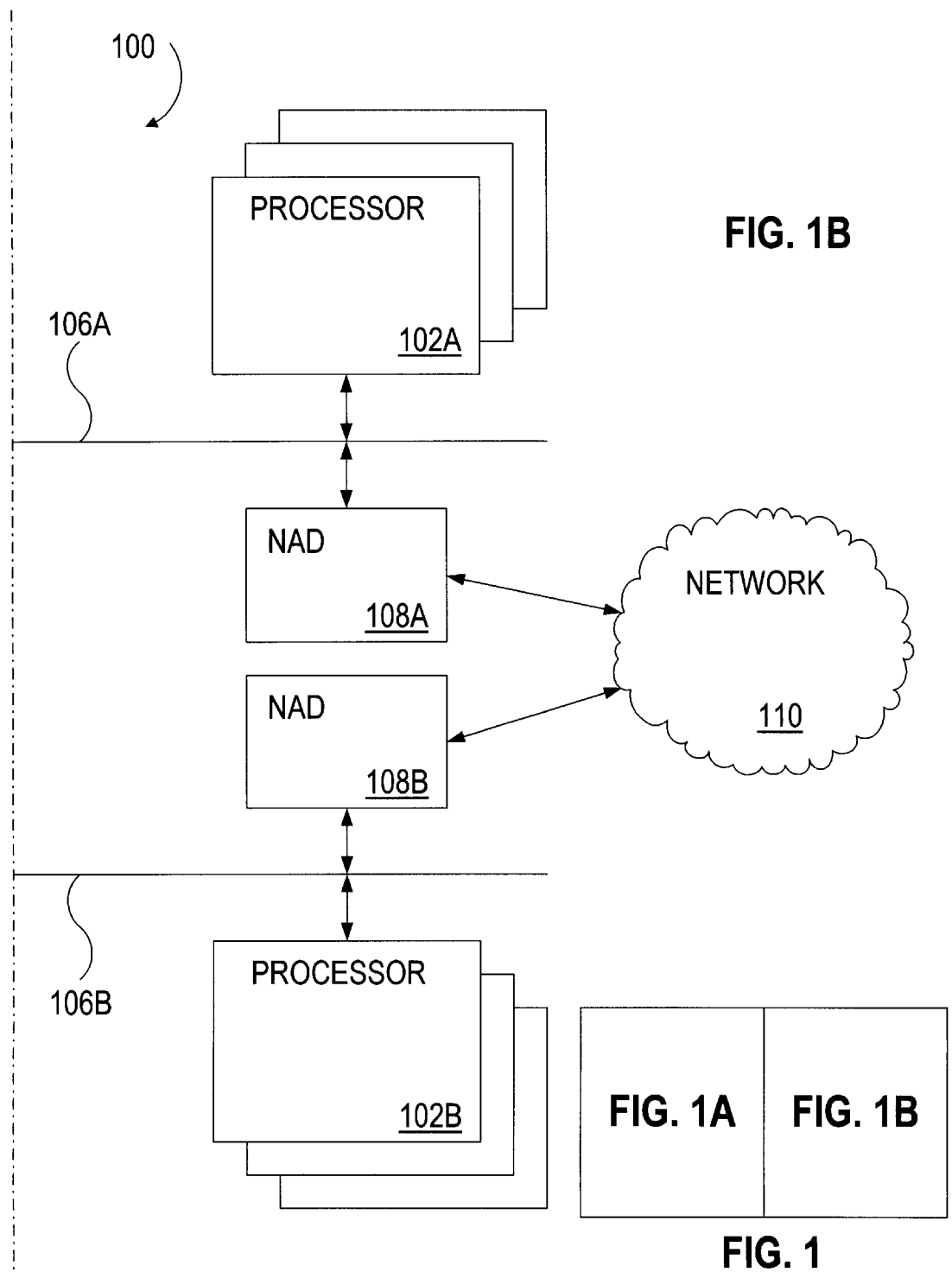

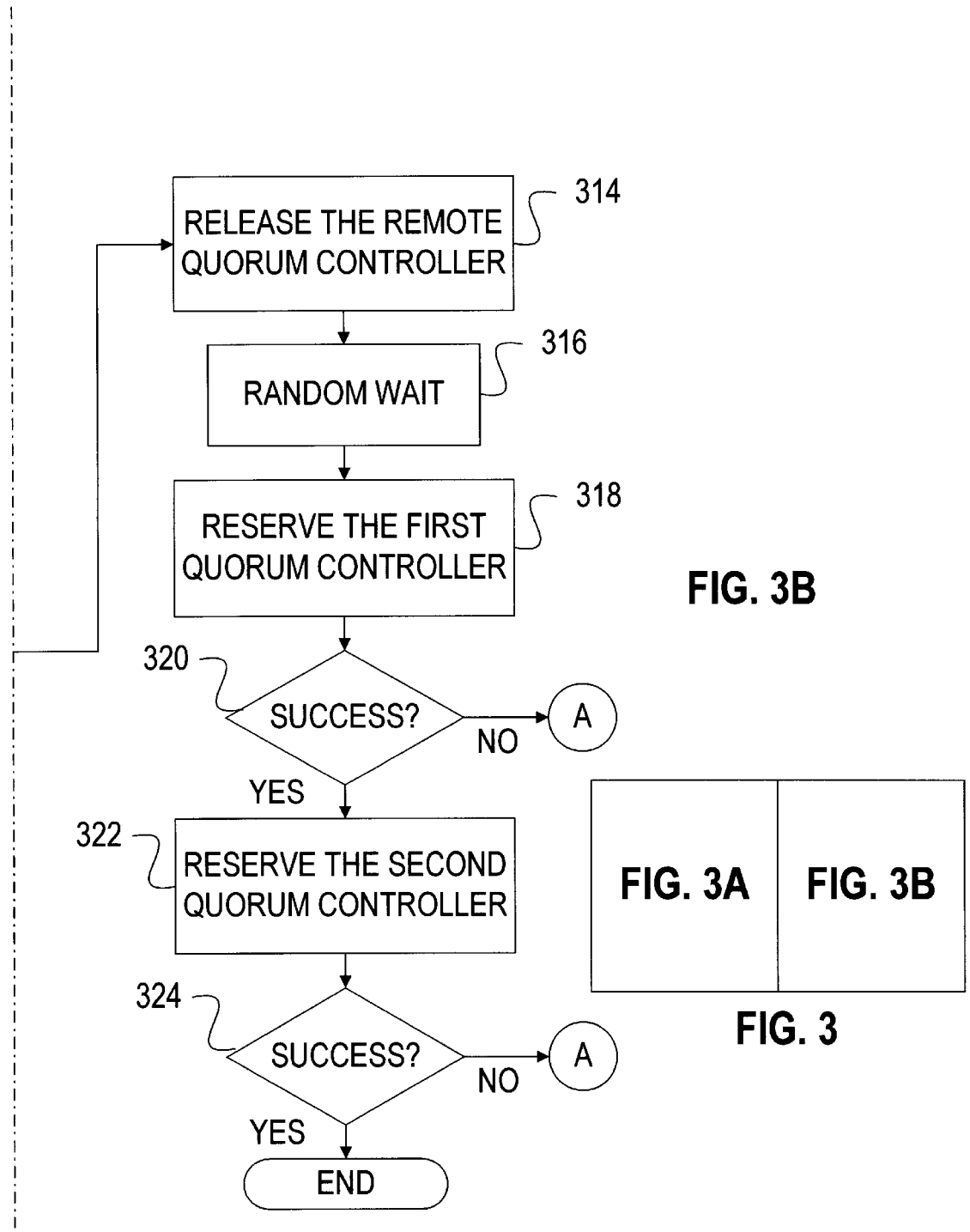

QUORUM MECHANISM IN A TWO-NODE DISTRIBUTED COMPUTER SYSTEM

This is a continuation of U.S. patent application Ser. No. 08/656,386 filed May 31, 1996, now U.S. Pat. No. 5,828,889.

FIELD OF THE INVENTION

The present invention relates to fault tolerance in distributed computer systems and, in particular, to a particularly robust mechanism for determining which of two nodes in a failing distributed computer system has exclusive access to shared resources.

BACKGROUND OF THE INVENTION

The complexity of tasks performed by computers today continues to grow rapidly. Accordingly, the importance of distributed computer systems, in which computer applications and databases are distributed over multiple computers, is increasing dramatically.

In a distributed computer system, multiple constituent computers of the distributed computer system, which are generally referred to as "nodes" or "hosts," have shared access to storage devices which collectively store a distributed database. Failure of a component of the distributed computer system can cause corruption of the distributed database and, therefore, potential loss of valuable and perhaps irreplaceable information stored in the distributed database. The following example is illustrative.

Suppose two nodes of a distributed computer system continue to operate normally, but a communications link between the two, through which the nodes coordinate access to the shared storage devices, fails. Each of the two nodes may continue to access the distributed database although shared access to the database cannot be coordinated. If both nodes continue to access the distributed database, the distributed database can very likely become corrupted and loss of valuable information can easily result. This is commonly known as the "split-brain" problem.

The following example illustrates the split-brain problem in more detail. Suppose that two separate computers are used to maintain bank records in a distributed database. Suppose further that two people, both of whom have access to a single account, deposit money into the account at substantially the same time, wherein each deposit transaction is recorded in the distributed database by a respective one of the two computers. Suppose further still that all communications between the two computers have failed. Each of the computers records the deposit by retrieving the current balance of the account, e.g., $200, and storing as the new balance the sum of the previous balance and the deposit amount, e.g., $500 by one person and $100 by the other person. If the computers access the distributed database at different times, each deposit is likely to be accurately recorded in the distributed database. However, if each computer retrieves the current balance at approximately the same time, each determines the current balance to be $200 and replaces the recorded balance with either $700 or $300. The new balance is then either $700 or $300 depending on which of the computers is the last to record the new balance, and the loss of the deposit remains undetected. However, if only one of the computers is allowed access to the distributed database, failure to record either deposit is noted and remedial action can be taken.

In this illustrative example, substantive information regarding a single transaction is lost. It is possible in some circumstances to lose information regarding inter-relationships regarding information stored in the distributed database, e.g., information regarding the location of various records of the distributed database. If such information is lost, significant portions of the distributed database can become irretrievable. The split-brain problem is therefore a serious problem with distributed databases and should be avoided.

There are generally two classes of solutions to the split-brain problem: solutions involving two-node distributed computer systems and solutions involving distributed computer systems having more than two nodes. In the latter class, a failed communications link can result in two groups of nodes which cannot communicate with one another. One conventional solution is to grant access to shared resources, e.g., shared storage devices, to the group containing a simple majority of the nodes of the distributed computer system. The group having such access to the shared storage devices is generally referred to as having attained a quorum. Each group can determine the number of nodes in the group and only one group can contain a simple majority of all nodes of the distributed computer system. The group containing less than a majority voluntarily refrains from accessing shared resources. If each group includes exactly one-half of the nodes of the distributed computer system, the problem becomes analogous to a split-brain problem involving a two-node distributed computer system and such a solution is generally employed.

In a two-node distributed computer system, the split-brain problem can be resolved by involving the two nodes in a race to reserve as many shared resources as possible. Such a race is generally referred to as a race for quorum. Each node attempts to reserve all shared storage devices. If a node successfully reserves a simple majority of all shared storage devices, that node has attained a quorum and has access to all shared devices. Conversely, if a node fails to reserve a simple majority of all shared storage devices, that node voluntarily refrains from accessing any shared storage device. Thus, if a node of the two-node distributed computer system fails, the remaining node successfully reserves a majority of shared storage devices and continues to manage the distributed database by access to the shared storage devices. In addition, if all communications links between the two nodes of a two-node distributed computer system fail, the two nodes race to reserve the shared storage devices, and the node which wins the race for quorum continues to manage the distributed database by accessing the shared storage devices while the node which loses the race for quorum voluntarily refrains from accessing any shared storage device to avoid corruption of the distributed database.

Use of shared storage device reservations as a race parameter becomes infeasible when reservation of such shared storage devices is a necessary part of access to such shared storage devices. For example, if a node of a two-node distributed computer system fails, reservations held by the failing node may not be relinquished. As a result, the remaining node, which has not failed, may not be able to reserve a majority of shared storage devices and, accordingly, may not continue to operate normally, i.e., may voluntarily refrain from accessing the shared storage devices in the mistaken belief that the remaining node has lost the race for quorum. Such is even more likely in conventional distributed computer systems which designate a single shared storage device as a quorum controller, reservation of which constitutes winning the race for quorum. A failing node may hold, and fail to relinquish, a reservation of the quorum controller. When the non-failing node cannot attain quorum, the distributed computer system fails, and such failure is unnecessary since the remaining node is otherwise generally capable of continuing to operate normally. A failed node can retain device reservations when the failure is software related, e.g., either the operating system of the node has failed or the computer process accessing or managing the distributed database has failed. When the operating system has failed, human interaction is generally required to bring the node to a state in which the held device reservations are relinquished. When a computer process other than the operating system has failed, the failure may go undetected by the operating system.

What therefore remains as an unsolved need in the industry is a quorum mechanism which does not require that a failed node relinquish reservations of shared storage devices.

SUMMARY OF THE INVENTION

In accordance with the present invention, each node of a failing distributed computer system races to achieve a quorum by successfully reserving two shared storage devices which are designated quorum controllers. During normal operation of the distributed computer system, each of the quorum controllers is associated with and reserved by a respective node. During the race for quorum in response to a detected failure of the distributed computer system, each node which has not failed forcibly reserves the quorum controller which is associated with the other node. If a node simultaneously holds reservations for both quorum controllers, that node has acquired a quorum. The forcible reservation of a shared storage device does not fail even if another node holds a valid reservation to the same storage device. Accordingly, a failed node which does not relinquish a reservation to the node's quorum controller cannot prevent another node from acquiring a quorum.

Prior to forcibly reserving the quorum controller of another node, each node verifies that it continues to hold a reservation of the node's own associated quorum controller. If a node no longer holds a reservation of the node's own associated quorum controller, that node has lost the race for quorum since another node has already forcibly reserved the former node's associated quorum controller. Thus, in accordance with the present invention, quorum can be efficiently and effectively determined by independent nodes of a failing distributed computer system notwithstanding the failure of a failing node to relinquish shared storage device reservations held by the failing node.

If a node has forcibly reserved the quorum controller of another node but no longer holds a valid reservation to the node's own quorum controller, the race for quorum has resulted in a tie. Both nodes of the distributed computer system must be operational for a tie to result. Therefore, there is no chance that a node can fail to relinquish a reservation of a shared storage device. Accordingly, a second race for quorum is used to resolve the tie between the nodes of the distributed computer system. Prior to the second race for quorum, each node relinquishes all reservations to any quorum controller such that no quorum controller is reserved by any node. In the second race for quorum, each node attempts to reserve a selected one of the quorum controllers in a predetermined sequence. The node which successfully reserves the selected quorum controller wins the second race for quorum and can access any of the shared storage devices. The other node determines that it has not acquired a quorum and voluntarily refrains from accessing any shared storage device.

Since force reservations are used in the first race for quorum, a node's failure to relinquish a reservation to a quorum controller cannot prevent another node from acquiring a quorum and, accordingly, subsequent access to the shared storage devices of the distributed computer system. The present invention therefore represents a significantly more robust and fault-tolerant mechanisms for determining quorum in a failing distributed computer system than prior art mechanisms. In addition, since each node has a quorum controller reserved during normal operation, loss of such a reservation during a race for quorum indicates that another node has forcible reserved the quorum controller and is therefore operative. As a result, a second race for quorum which requires that each node relinquish reservations of quorum controllers can be used in resolve quorum when the first race for quorum results in a tie.

DETAILED DESCRIPTION

In accordance with the present invention, two shared storage devices, e.g., shared storage devices 112A and 112B (FIG. 2), of a two-node distributed computer system 100 are designated quorum controllers and are used in a novel quorum acquisition process, which is described more completely below. Briefly, each of nodes 100A–B of distributed computer system 100 detect a failure of the other node and performs the quorum acquisition process to form consensus regarding which of nodes 100A–B has acquired a quorum and which therefore has access to shared storage devices 112A–D and can therefore continue to operate. Each node has a respective one of the quorum controllers reserved during normal operation. A node acquires a quorum by reserving both quorum controllers. A node reserves a quorum controller which is normally reserved to another node by using a forcible reservation, which is described more completely below. The forcible reservation of a shared storage device does not fail even if another node holds a valid reservation to the same storage device and therefore prevents a failed node from preventing another node to acquire a quorum.

Figure 1A:
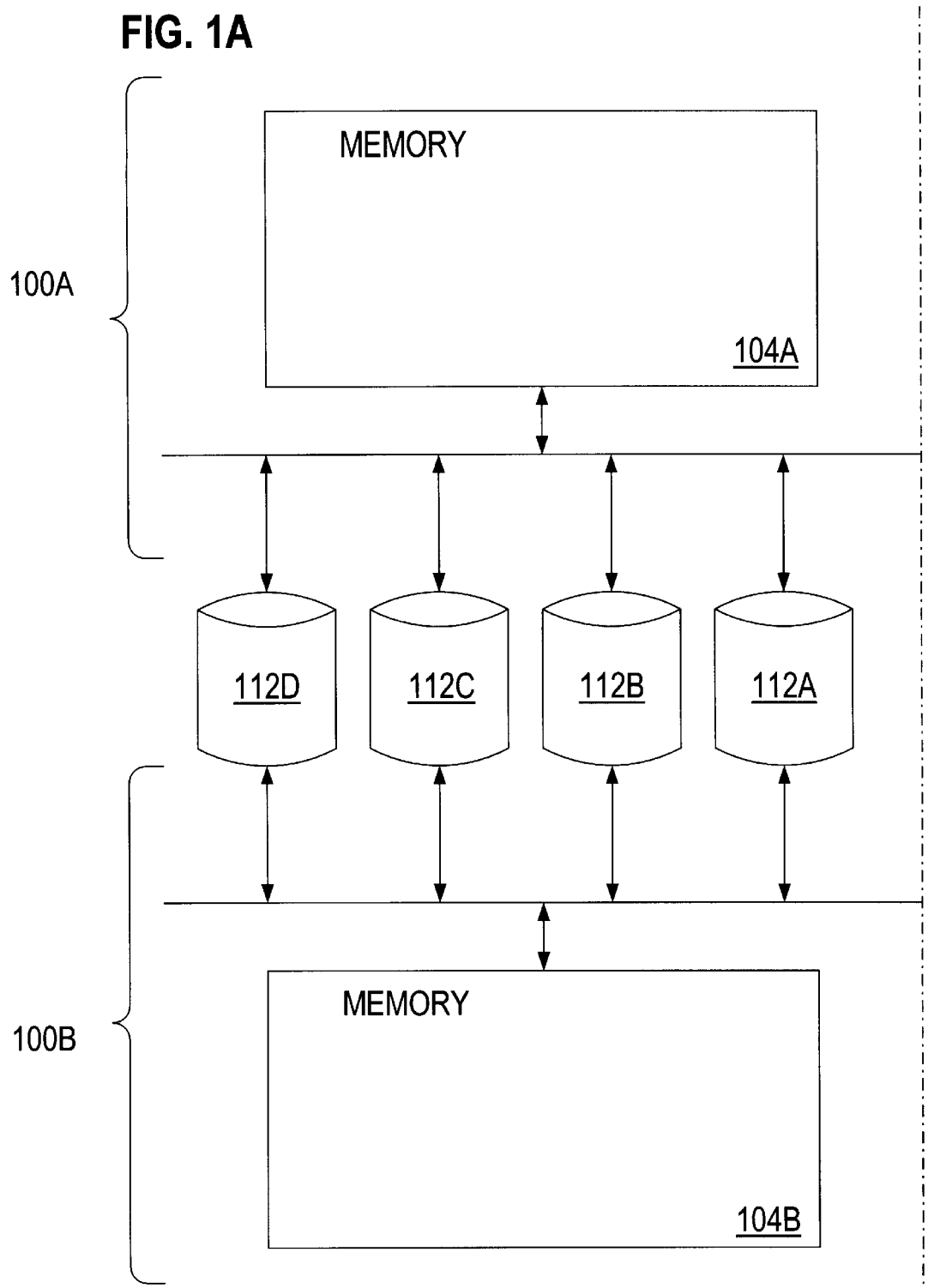
FIG. 1 is a block diagram of a two-node distributed computer system in accordance with the present invention.

Appreciation of the present invention is facilitated by the following description of the hardware and software components of two-node distributed computer system 100 (FIG. 1). Distributed computer system 100 includes a node 100A and a node 100B. Nodes 100A–B are directly analogous to one another and the following description of node 100A is equally applicable to node 100B.

Node 100A includes one or more processors 102A, each of which retrieves computer instructions from memory 104A through a bus 106A and executes the retrieved computer instructions. In executing retrieved computer instructions, each of processors 102A can retrieve data from and write data to memory 104 and any and all of shared storage devices 112A–D through bus 106. Memory 104 can include any type of computer memory including, without limitation, randomly accessible memory (RAM), read-only memory (ROM), and storage devices which use magnetic and/or optical storage media such as magnetic and/or optical disks. Shared storage devices 112A–D are each a storage device or an array of storage devices which can be simultaneously coupled to two or more computers. As shown in FIG. 1, each of shared storage devices 112A–D is coupled both to bus 106A of node 100A and to bus 106B of node 100B. Each of shared storage devices 112A–D is accessed by each of nodes 100A and 100B as a single device although each of shared storage devices 112A–D can be an array of storage devices. For example, any of shared storage devices 112A–D can be a SPARC Storage Array available from Sun Microsystems, Inc. of Mountain View, Calif.

Each of shared storage devices 112A–D can be reserved by either node 100A or node 100B. For example, any of processors 102A can issue control signals through bus 106 to shared storage device 112C which cause reservation of storage device 112C. In response to the control signals, shared storage device 112C determines whether shared storage device 112C is already reserved as represented in the physical state of shared storage device 112C, e.g., in the state of a flag or an identification of the holder of the current reservation as represented in a register of shared storage device 112C. If shared storage device 112C is not currently reserved, shared storage device 112C changes its physical state to indicate that shared storage device 112C is now reserved by node 100A. Conversely, if shared storage device 112C is currently reserved, shared storage device 112C sends through bus 106 to processors 102A signals which indicate that the attempted reservation is refused.

In addition, each of processors 102A can issue control signals to a network access device 108A which cause network access device 108A to transfer data through network 110 between network access device 108A of node 100A and network access device 108B of node 100B in a conventional manner. In one embodiment, network 110 is the well-known Ethernet network and network access devices 108A and 108B are conventional Ethernet controller circuitry.

Figure 2A:
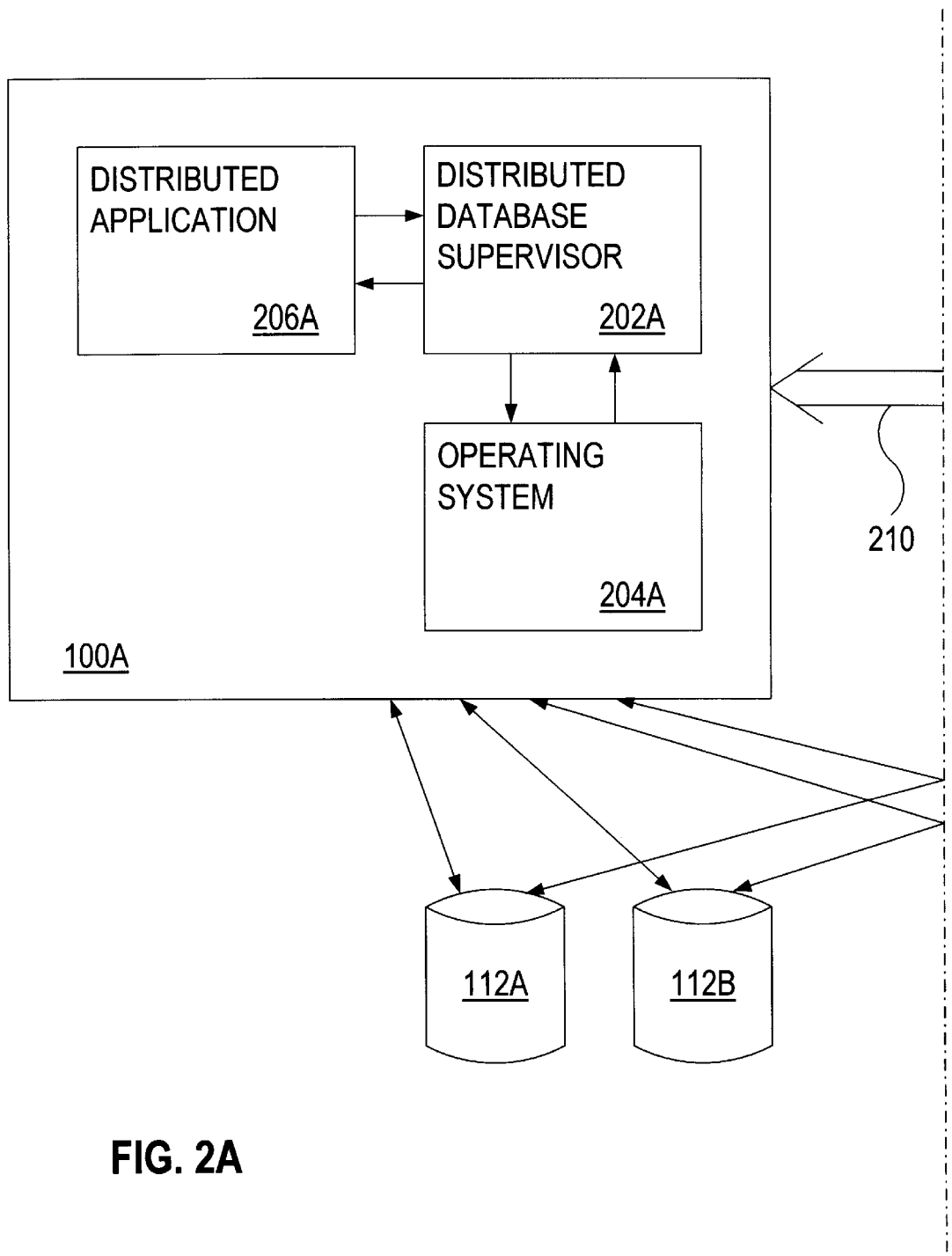
FIG. 2 is a block diagram of the two-node distributed computer system of FIG. 1 and shows computer processes executing within each of the nodes of the distributed computer system.
Figures 2, 2B:
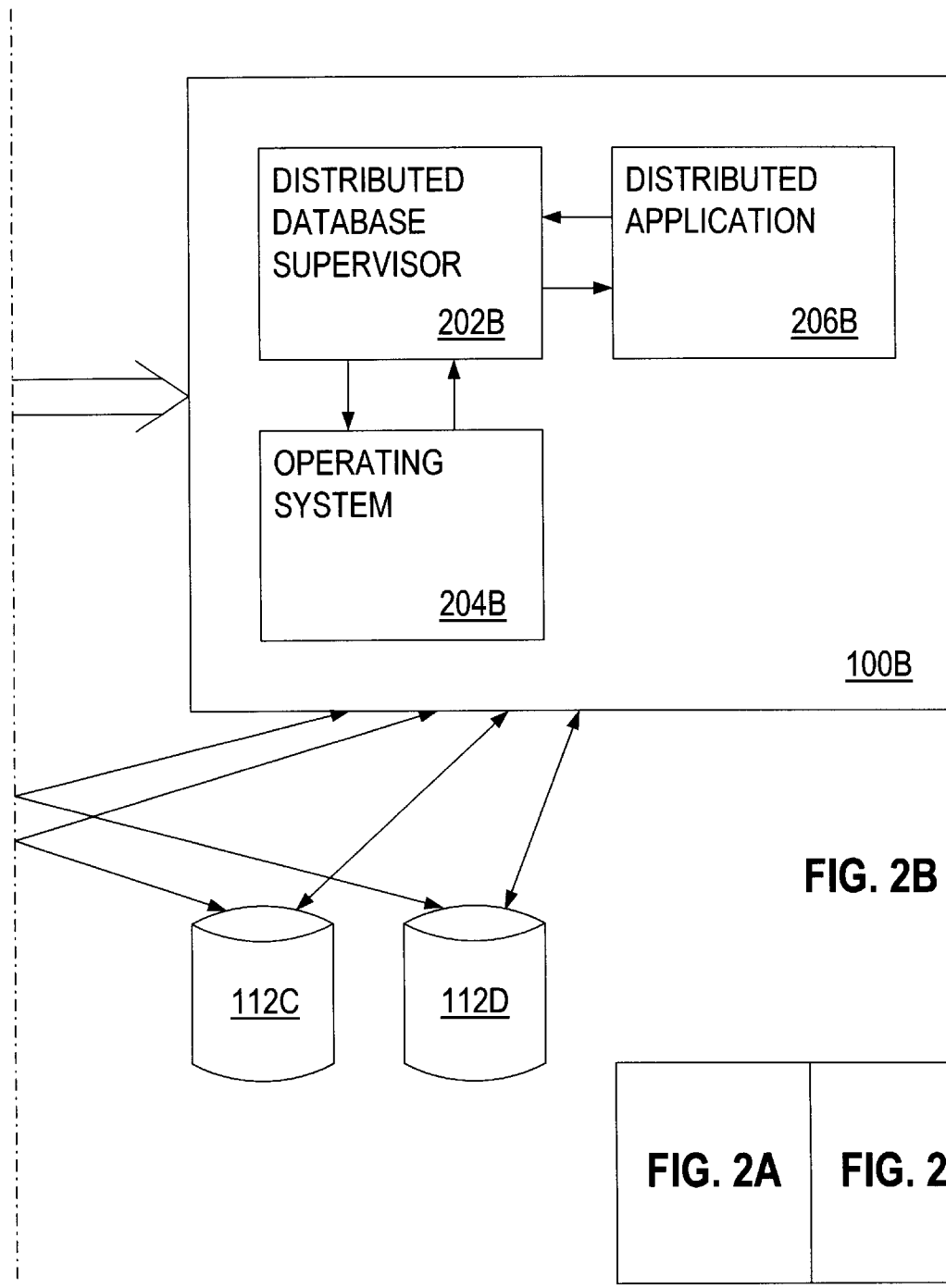

Distributed computer system 100 is represented in simplified form in FIG. 2. Executing within node 100A are the following computer processes: (i) distributed database supervisor 202A, (ii) operating system 204A, and (iii) distributed application 206A. Similarly, distributed database supervisor 202B, operating system 204B, and distributed application 206B execute within node 100B and are directly analogous to distributed database supervisor 202A, operating system 204A, and distributed application 206A, respectively. Accordingly, the following description of distributed database supervisor 202A, operating system 204A, and distributed application 206A is equally applicable to distributed database supervisor 202B, operating system 204B, and distributed application 206B, respectively.

Distributed application 206A cooperates with distributed application 206B to manage a distributed database which is stored in one or more of shared storage devices 112A–D. Distributed application 206A manages the distributed database by storing data in and retrieving data from the distributed database and by maintaining metadata within the database. Metadata generally refers to data within a database which represents a structure of substantive data within the database, frequently representing inter-relationships between substantive data stored in the database. In one embodiment, distributed application 206A is the Oracle Parallel Server available from Oracle Corporation of Redwood Shores, Calif.

Prior to accessing any data of the distributed database, e.g., a particular block of data of the distributed database, distributed application 206A requests from distributed database supervisor 202A exclusive access to the particular block of data. Distributed database supervisor 202A coordinates with distributed database supervisor 202B to acquire exclusive access to the particular block of data and indicates through reply signals to distributed application 206A whether distributed application 206A has exclusive access to the particular block of data. If distributed application 206A successfully acquires exclusive access to the particular block of data, distributed application 206A can store data in the particular block of data without simultaneous access by node 100B and therefore without risking corruption of the distributed database.

Distributed database supervisor 202A communicates and cooperates with distributed database supervisor 202B to acquire and relinquish exclusive access for distributed application 206A to specific blocks of data stored in shared storage devices 112A–D. Distributed database supervisors 202A–B communicate through communications link 210, which includes network access devices 108A–B (FIG. 1) and network 110. If node 100B (FIG. 2) or communications link 210 fails, distributed database supervisor 202A (FIG. 2) detects the failure and reports the failure to operating system 204A. Failure detection by distributed database supervisor 202A is described more completely below.

Figure 3A:
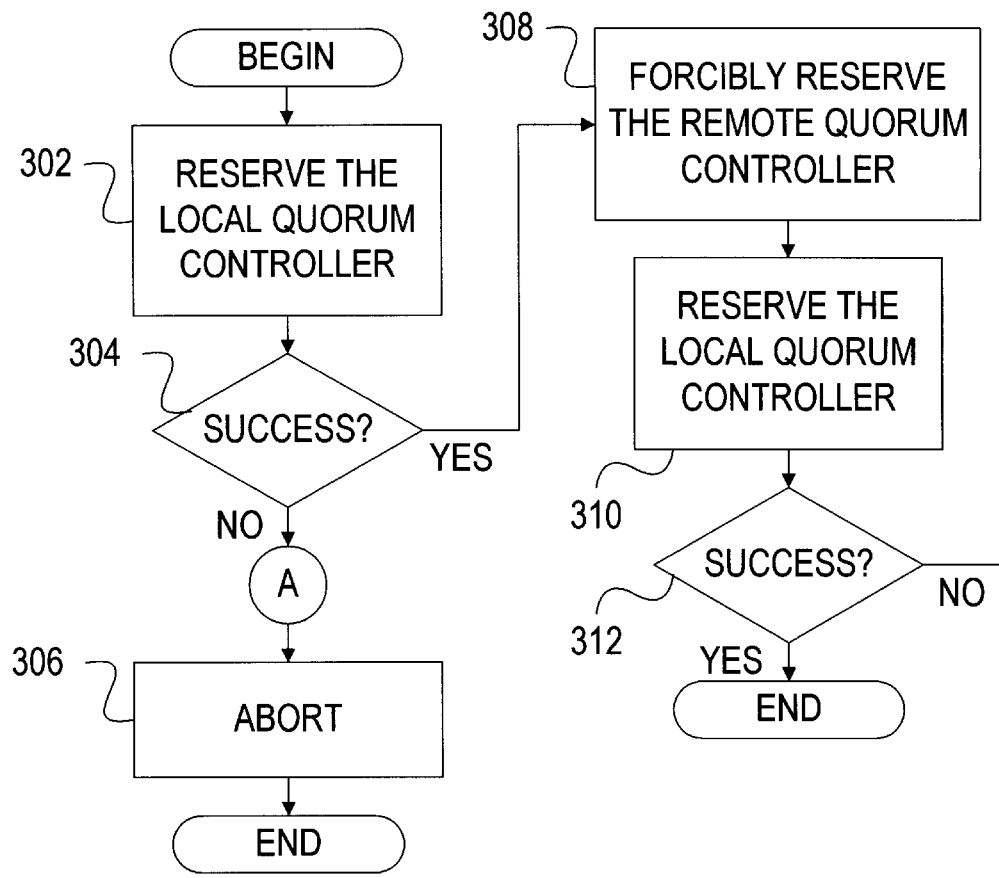
FIG. 3 is a logic flow diagram of the determination by each node regarding which of the nodes acquires quorum in a fault condition.

In response to detection of a failure of communications link 210 or node 100B, distributed database supervisor 202A attempts to acquire a quorum according to the steps shown in logic flow diagram 300 (FIG. 3). If distributed database supervisor 202A (FIG. 2) successfully acquires a quorum according to logic flow diagram 300 (FIG. 3), distributed database supervisor 202A (FIG. 2) (i) assumes that distributed database supervisor 202B can no longer access any of shared storage devices 112A–D and (ii) allows distributed application 206A to continue to access shared storage devices 112A–D. Conversely, if distributed database supervisor 202A fails to acquire a quorum according to logic flow diagram 300 (FIG. 3), distributed database supervisor 202A (FIG. 2) (i) assumes that node 100B has not failed and has acquired a quorum and (ii) voluntarily refrains from granting to distributed application 206A access to shared storage devices 112A–D since exclusive access cannot be guaranteed.

Processing according to logic flow diagram 300 (FIG. 3) presumes that a respective one of shared storage devices 112A–D (FIG. 2) has been designated as a quorum controller for each of nodes 100A and 100B. For example, shared storage device 112A can be designated as the quorum controller for node 100A and shared storage device 112B can be designated as the quorum controller for node 100B. Generally, any shared storage device can be designated as the quorum controller for a node of distributed computer system 100 (FIG. 1) as long as the following criteria are met. First, a physically different shared storage device must be designated as a quorum controller for each node. Second, the quorum controller for a particular node must be reserved to the node during normal operation of the node. Third, the quorum controller for each node must be physically shared by the nodes of distributed computer system 100. In the illustrative example described herein, (i) shared storage devices 112A and 112B are physically different devices, (ii) shared storage devices 112A and 112B are reserved by nodes 100A and 100B, respectively, during normal operation of nodes 100A and 100B, respectfully, and (iii) shared storage devices 112A and 112B are physically shared by nodes 100A and 100B. Accordingly, designation of shared storage devices 112A and 112B as quorum controllers for nodes 100A and 100B, respectively, is an appropriate designation.

Processing according to logic flow diagram 300 (FIG. 3) further presumes that the quorum controllers for nodes 100A (FIG. 2) and 100B are ordered. The particular order of the quorum controllers is not particularly significant so long as both nodes 100A and 100B agree with respect to the particular ordering of the quorum controllers. In this illustrative example, shared storage device 112A is the first quorum controller, and shared storage device 112B is the second quorum controller. The ordering of the quorum controllers is used in a manner described more completely below to effect a second race for quorum if the first race for quorum results in a tie.

It is helpful in understanding the following description of logic flow diagram 300 (FIG. 3) to remember that, in the event of a failure of communications link 210, both nodes 100A and 100B perform the steps of logic flow diagram 300 (FIG. 3) independently as each detects the failure. Logic flow diagram 300 (FIG. 3) is described in the context of node 100A. Processing according to logic flow diagram 300 (FIG. 3) by node 100B (FIG. 2) is directly analogous to the processing according to logic flow diagram 300 (FIG. 3) by node 100A (FIG. 2) as described below.

Steps 302–308 (FIG. 3) represent a race for quorum between nodes 100A (FIG. 2) and 100B. With step 302 (FIG. 3), processing according to logic flow diagram 300 begins. In step 302, distributed database supervisor 202A (FIG. 2) reserves on behalf of node 100A the quorum controller of the node in which distributed database supervisor 202A executes, i.e., node 100A. Reservation of a shared storage device by distributed database supervisor 202A is conventional and known but is described briefly for completeness.

Distributed database supervisor 202A reserves any one of shared storage devices 112A–D, e.g., shared storage device 112C, by issuing through processors 102A (FIG. 1) a computer instruction, execution of which sends to shared storage device 112C signals requesting reservation of shared storage device 112C by node 100A. If shared storage device 112C is not reserved, shared storage device 112C changes its physical state to a reserved state in which storage device 112C sends to distributed database supervisor 202A through processors 102A signals indicating that shared storage device 112C is reserved by node 100A. Conversely, if shared storage device 112C is reserved when reservation requesting signals are received from processors 102A, shared storage device 112C sends to distributed database supervisor 202A through processors 102A signals indicating that the requested reservation of shared storage device 112C is refused. In this embodiment, reservations are held by a node, and distributed database supervisor 202A therefore requests reservations on behalf of node 100A.

In the context of distributed database supervisor 202A, the quorum controller of node 100A is called the "local quorum controller" and, in this illustrative example, is shared storage device 112A. Frequently, step 302 (FIG. 3) will be a null operation, i.e., a step in which processors 102A (FIG. 1) take no action, since node 100A (FIG. 2) normally has the local quorum controller reserved. From step 302 (FIG. 3), processing transfers to test step 304 in which distributed database supervisor 202A (FIG. 2) determines whether the reservation of the local quorum controller is successful. As discussed more completely below, reservation of the local quorum controller can fail if distributed database supervisor 202B performs step 308 (FIG. 3), which is described below, before distributed database supervisor 202A (FIG. 2) performs step 302 (FIG. 3). Under such circumstances, distributed database supervisor 202B (FIG. 2) wins the race for quorum and can access shared storage devices 112A–D.

Figure 4:
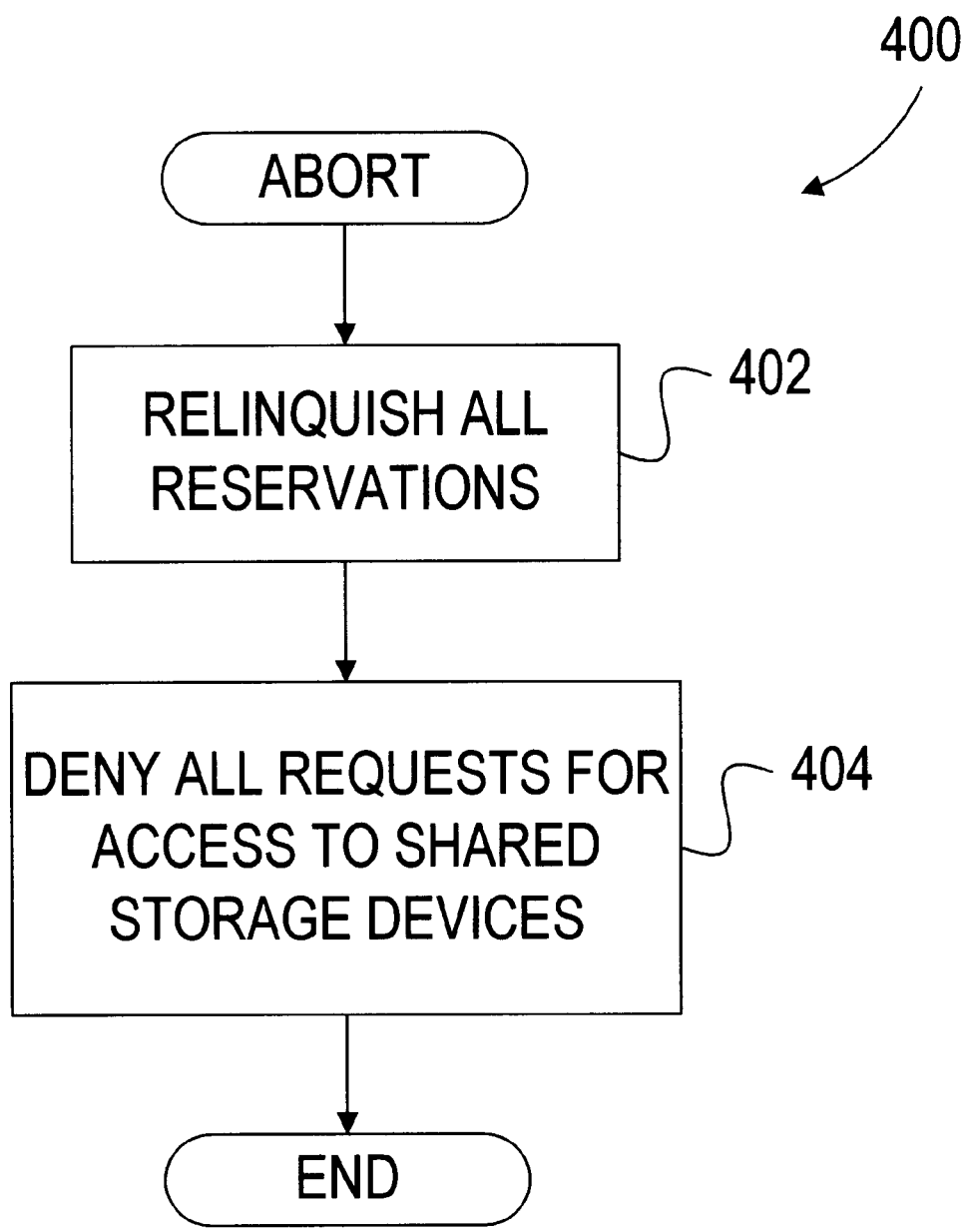
FIG. 4 is a logic flow diagram of the processing of a node of the distributed computer system of FIGS. 1 and 2 upon determination that quorum is not acquired.

If distributed database supervisor 202A fails to reserve the local quorum controller, processing transfers from test step 304 (FIG. 3) to step 306 in which distributed database supervisor 202A (FIG. 2) aborts processing. Step 306 (FIG. 3) is shown in greater detail as logic flow diagram 306 (FIG. 4) in which processing begins in step 402. In step 402, distributed database supervisor 202A (FIG. 2) relinquishes all reservations held by node 100A of any of shared storage devices 112A–D. Processing transfers to step 404 (FIG. 4) in which distributed database supervisor 202A (FIG. 4) denies all requests from distributed application 206A (FIG. 2) for access to any of shared storage devices 112A–D. After step 404 (FIG. 4), processing according to logic flow diagram 306, and therefore step 306 (FIG. 3), terminates. After step 306, processing according to logic flow diagram 300 terminates and distributed database supervisor 202A (FIG. 2) has lost the race for quorum.

If, in test step 304 (FIG. 3), distributed database supervisor 202A (FIG. 2) determines that the local quorum controller, i.e., shared storage device 112A in this illustrative example, is successfully reserved by node 100A, processing transfers to step 308 (FIG. 3). In step 308, distributed database supervisor 202A (FIG. 2) forcibly reserves on behalf of node 100A the quorum controller of the node in which distributed database supervisor 202A does not execute, i.e., node 100B. In the context of distributed database supervisor 202A, the quorum controller of node 100B is called the "remote quorum controller" and, in this illustrative example, is shared storage device 112B. Ordinarily, attempted reservation of a device, which is already reserved by another computer process, fails. However, a forcible reservation of a device is a reservation which succeeds notwithstanding a prior reservation of the device which continues to be held by another node. Forcible reservations are known and are part of the Small Computer Serial Interface 3 (SCSI-3) standard established by the Common Access Method (CAM) Committee.

Thus, if node 100B itself or distributed database supervisor 202B has failed, i.e., if node 100B or distributed database supervisor 202B is now inoperative, distributed database supervisor 202A reserves for node 100A both quorum controllers in steps 302 (FIG. 3) and 308. This is true even if distributed database supervisor 202B (FIG. 2) failed to relinquish the reservation of node 100B of its local quorum controller, e.g., shared storage device 112B, since distributed database supervisor 202A forcibly reserves on behalf of node 100A the local quorum controller of node 100B. Accordingly, failure to relinquish a reservation of a shared storage device when a node of distributed computer system 100 (FIG. 1) fails cannot result in failure of distributed computer system 100 and the remaining operational node can acquire a quorum. It is appreciated that the local quorum controller of distributed database supervisor 202B (FIG. 2) is the remote quorum controller of distributed database supervisor 202A and the remote quorum controller of distributed database supervisor 202B is the local quorum controller of distributed database supervisor 202A.

If node 100B and distributed database supervisor 202B continue to operate, steps 302–308 (FIG. 3) represent a race to reserve both quorum controllers. As described above with respect to test step 304, it is possible that distributed database supervisor 202A (FIG. 2) fails to reserve on behalf of node 100A its local quorum controller. Such a reservation fails if distributed database supervisor 202B (FIG. 2) forcibly reserves its remote quorum controller, i.e., the local quorum controller of distributed database supervisor 202A, in performing step 308 (FIG. 3) prior to performance of step 302 by distributed database supervisor 202A (FIG. 2). In such circumstances, distributed database supervisor 202B wins the race for quorum and distributed database supervisor 202A aborts in step 306 (FIG. 3) as described more completely above.

If distributed database supervisor 202A (FIG. 2) has won the race for quorum of steps 302 (FIG. 3) through 308, node 100A (FIG. 2) has reserved both the local quorum controller and the remote quorum controller, e.g., both shared storage devices 112A and 112B. Conversely, if distributed database supervisor 202A has lost the race for quorum, node 100B has reserved both the local and the remote quorum controller and processing by distributed database supervisor 202A terminates after performance of step 306 (FIG. 3).

If the race for quorum between distributed database supervisors 202A (FIG. 2) and 202B results in a tie, i.e., if distributed database supervisors 202A and 202B perform steps 302–308 (FIG. 3)—and step 308 in particular—substantially simultaneously, each of nodes 100A–B has the remote quorum controller reserved but does not have the local quorum controller reserved. In this illustrative example, such a tie results in shared storage device 112B (FIG. 2) reserved by node 100A and shared storage device 112A reserved by node 100B. In steps 310–312 (FIG. 3), distributed database supervisor 202A (FIG. 2) tests for such a tie, as does distributed database supervisor 202B in a separate, independent performance of steps 310–312 (FIG. 3).

In step 310, distributed database supervisor 202A (FIG. 2) attempts to reserve on behalf of node 100A its local quorum controller. In test step 312 (FIG. 3), distributed database supervisor 202A (FIG. 2) determines whether the attempted reservation of step 310 (FIG. 3) is successful. If the reservation of the local quorum controller is successful, distributed database supervisor 202A (FIG. 2) has won the race for quorum and processing according to logic flow diagram 300 (FIG. 3) terminates. If distributed database supervisor 202A (FIG. 2) has won the race for quorum, distributed database supervisor 202A can grant requests by distributed application 206A access to any of shared storage devices 112A–D. If, in test step 312 (FIG. 3), distributed database supervisor 202A (FIG. 2) determines that the attempted reservation of step 310 (FIG. 3) failed, distributed database supervisor 202A (FIG. 2) determines that the race for quorum of steps 302–308 (FIG. 3) results in a tie and processing transfers from test step 312 to step 314.

Steps 314–324 represent a tie-breaking mechanism in which distributed database supervisors 202A (FIG. 2) and 202B participate in a second race for quorum. Since step 314 (FIG. 3) is performed only when a tie results in the first race for quorum, distributed database supervisors 202A (FIG. 2) and 202B assume that both distributed database supervisors 202A and 202B are operative and the detected failure is in communications link 210. Accordingly, the second race for quorum can use the reservation mechanism of shared storage devices 112A–D as an arbitration mechanism of the second race for quorum. In step 314 (FIG. 3), distributed database supervisor 202A (FIG. 2) causes node 100A to relinquish the reservation to the remote quorum controller such that node 100A no longer has either quorum controller reserved. In an analogous, independent performance of step 314 (FIG. 3) by distributed database supervisor 202B (FIG. 2), distributed database supervisor 202B causes node 100B to relinquish its remote quorum controller such that node 100B no longer has either quorum controller reserved. Processing transfers from step 314 (FIG. 3) to step 316.

In step 316, distributed database supervisor 202A (FIG. 2) waits a randomly selected amount of time. Specifically, distributed database supervisor 202A generates a random number representing an amount of time within a predetermined range of time and distributed database supervisor 202A remains in an inoperative state during that randomly selected amount of time. Since the amount of time to wait is dependent upon a randomly generated number, distributed database supervisors 202A and 202B are likely to wait for different amounts of time and are therefore likely to finish respective independent performances of step 316 (FIG. 3) at different times.

Processing transfers to step 318 in which distributed database supervisor 202A (FIG. 2) attempts to reserve on behalf of node 100A the first quorum controller. As described above, the quorum controllers are ordered and have the same ordering within both distributed database supervisors 202A and 202B. Thus, in analogous and separate performances of step 318 (FIG. 3) by distributed database supervisors 202A (FIG. 2) and 202B, both distributed database supervisor 202A and distributed database supervisor 202B attempt to reserve the same quorum controller, i.e., the same shared storage device. In this example, shared storage device 112A is the first quorum controller.

From step 318 (FIG. 3), processing transfers to test step 320 in which distributed database supervisor 202A (FIG. 2) determines whether the attempted reservation of step 318 (FIG. 2) succeeded. If the attempted reservation failed, distributed database supervisor 202A (FIG. 2) has lost the second race for quorum and processing transfers to step 306 (FIG. 3) in which distributed database supervisor 202A (FIG. 2) aborts as described more completely above. Conversely, if distributed database supervisor 202A determines in test step 320 (FIG. 3) that the attempted reservation of step 318 succeeded, processing transfers to step 322. At this point, distributed database supervisor 202A (FIG. 2) can not be certain that distributed database supervisor 202A has acquired quorum. Since distributed database supervisors 202A and 202B execute independently and perhaps at different speeds, it is possible that distributed database supervisor 202A performs step 308 (FIG. 3) just prior to performance of step 322, which is described below, by distributed database supervisor 202B. In such a situation, node 100B has the second quorum controller, e.g., shared storage device 112B, reserved and distributed database supervisor 202A cannot therefore reserve both quorum controllers on behalf of node 100A and cannot therefore acquire quorum.

In step 322, distributed database supervisor 202A (FIG. 2) attempts to reserve the second quorum controller, which is shared storage device 112B in this illustrative example. From step 322 (FIG. 3), processing transfers to test step 324 in which distributed database supervisor 202A (FIG. 2) determines whether the attempted reservation of step 320 (FIG. 3) succeeded. If the attempted reservation failed, distributed database supervisor 202A (FIG. 2) has lost second race for quorum and processing transfers to step 306 (FIG. 3) in which distributed database supervisor 202A (FIG. 2) aborts as described more completely above. In such a situation, distributed database supervisor 202B proceeds with performance of steps 316–324 (FIG. 3) and successfully acquires a quorum. Conversely, if distributed database supervisor 202A (FIG. 2) determines in test step 324 (FIG. 3) that the attempted reservation of step 322 succeeded, distributed database supervisor 202A (FIG. 2) has won the second race for quorum and processing according to logic flow diagram 300 (FIG. 3) terminates. As described above, if distributed database supervisor 202A (FIG. 2) wins the race for quorum, distributed database supervisor 202A grants to distributed application 206A access to any of shared storage devices 112A–D.

Thus, in accordance with the steps of logic flow diagram 300 (FIG. 3), distributed database supervisors 202A (FIG. 2) and 202B independently achieve consensus regarding which of distributed database supervisors 202A and 202B acquires a quorum, and therefore access to shared storage devices 112A–D, without requiring that a failing node relinquish reservations during such failure. Accordingly, the present invention represents a substantial improvement in fault tolerance of two-node distributed computer systems over prior art mechanism.

Failure Detection

As described above, distributed database supervisor 202A (FIG. 2) detects a failure of either node 100B or communications link 210. Detection of a failure of distributed computer system 100 by distributed database supervisor 202A is described briefly for completeness. Distributed database supervisor 202A detects the failure in a generally conventional manner, e.g., by observing that no message has been received from distributed database supervisor 202B in a predetermined amount of time. For example, distributed database supervisor 202A can be configured to send to distributed database supervisor 202B a status request signal which directs distributed database supervisor 202B to respond with a signal containing data representing the status of distributed database supervisor 202B. If distributed database supervisor 202A does not receive such data from distributed database supervisor 202B within a predetermined amount of time, e.g., one second, from the time the status request signal is sent, a failure is assumed by distributed database supervisor 202A. Alternatively, distributed database supervisor 202B can be configured to send to distributed database supervisor 202A signal representing the status of distributed database supervisor 202B at predetermined intervals, e.g., every second. Failure to receive any such signals for a predetermined period of time, e.g., two or three times the predetermined interval, can be interpreted by distributed database supervisor 202A as a failure of communications link 210 or node 100B.

The above description is illustrative only and is not limiting. The present invention is therefore defined solely and completely by the appended claims together with their full scope of equivalents.

What is claimed is:

1. A method for granting to one of at least two nodes of a distributed computer system exclusive access to shared resources of the distributed computer system, which includes at least two preselected shared devices and in which each node includes a fault handler and has a state which specifies whether the node has exclusive access to the shared resources, the method comprising the steps of:

detecting a fault condition in the distributed computer system;

causing each of the fault handlers to perform the following steps when a fault condition is detected:

attempting to reserve all of the preselected shared devices, at least one of which is reserved by one of the at least two nodes other than the node of the fault handler in the absence of a fault condition;

causing the state of the node to specify that the node has exclusive access to the shared resources if the fault handler succeeds in reserving all of the preselected shared devices; and causing the state of the node to specify that the node does not have exclusive access to the shared resources if the fault handler fails to reserve all of the preselected shared devices;

designating for each node of the two-node distributed computer system a local shared device of the preselected shared devices;

wherein the step of attempting comprises:

attempting to reserve the local shared device of the node of the fault handler; and forcibly reserving at least one preselected shared device other than the local shared device of the node of the fault handler if the fault handler successfully reserves the local shared device of the node of the fault handler.

2. A computer program product comprising:

a computer usable medium having computer readable code embodied therein for granting to one of at least two nodes of a distributed computer system exclusive access to shared resources of the distributed computer system, which includes at least two preselected shared devices and in which each node includes a fault handler and has a state which specifies whether the node has exclusive access to the shared resources, the computer usable medium comprising:

a fault detection module which is configured to detect a fault condition in the distributed computer system;

a fault handling module which is operatively coupled to the fault detection module and which is configured to perform the following steps when a fault condition is detected:

attempting to reserve all of the preselected shared devices, at least one of which is reserved by one of the at least two nodes other than the node of the fault handling module in the absence of a fault condition;

causing the state of the node to specify that the node has exclusive access to the shared resources if the fault handling module succeeds in reserving all of the preselected shared devices; and causing the state of the node to specify that the node does not have exclusive access to the shared resources if the fault handler fails to reserve all of the preselected shared devices;

a fault handling module which is configured to perform the step of attempting by performing at least the following steps:

attempting to reserve a local shared device of the preselected shared devices; and forcibly reserving at least one preselected shared device other than the local shared device if the fault handling module successfully reserves the local shared device.

3. An apparatus for recovering from a failure in a distributed computer system which includes shared resources and at least two nodes, the apparatus comprising:

a fault detector which corresponds to a selected one of the nodes of the distributed computer system and which detects a fault condition in the distributed computer system;

a fault handler (i) which is operatively coupled to the fault detector, (ii) which has a state which specifies whether the selected node has exclusive access to the shared resources, and (iii) which, upon detection of the fault condition:
(a) attempts to reserve all of the preselected shared devices, at least one of which is reserved by one of the at least two nodes other than the selected node in the absence of a fault condition;
(b) causes the state of the fault handler to specify that the selected node has exclusive access to the shared resources if the fault handler succeeds in reserving all of the preselected shared devices; and
(c) causes the state of the fault handler to specify that the selected node does not have exclusive access to the shared resources if the fault handler fails to reserve all of the preselected shared devices, a fault handler which attempts to reserve all of the preselected shared devices by (i) attempting to reserve a local shared device of the preselected shared devices and (ii) forcibly reserving at least one local shared device if the fault handler successfully reserves the local shared device.

4. A distributed computer system comprising:

shared resources which include at least two preselected shared devices;

at least two nodes, each of which is operatively coupled to each of the preselected shared devices and each of which comprises:
   at least one processor;
   a network access device which is operatively coupled to the at least one processor and through which the at least one processor can communicate with at least one processor of another of the at least two nodes;
   a fault detector which detects a fault condition in which the node can no longer communicate with at least one other of the at least two nodes;
   a fault handler (i) which is operatively coupled to the fault detector, (ii) which has a state which in turn specifies whether the node has exclusive access to the shared resources, and (iii) which, upon detection of the fault condition;
   (a) attempts to reserve all of the preselected shared devices, at least one of which is reserved by one of the at least two nodes other than the fault handler in the absence of a fault condition;
   (b) causes the state of the fault handler to specify that the node has exclusive access to the shared resources if the fault handler succeeds in reserving all of the preselected shared devices; and
   (c) causes the state of the fault handler to specify that the node does not have exclusive access to the shared resources if the fault handler fails to reserve all of the preselected shared devices,
   a fault handler of each node which attempts to reserve all of the preselected shared devices by (i) attempting to reserve a selected one of the preselected shared devices which is local to the node and (ii) forcibly reserving at least one of the preselected shared devices other than the selected shared device if the fault handler successfully reserves the selected shared device.

5. A system for distributing code (i) which is stored on a computer-readable medium, (ii) which is executable by a computer, and (iii) which includes at least one module, each of which in turn is configured to carry out at least one function to be executed by the computer, the system comprising:

a fault detection module which is configured to detect a fault condition in a distributed computer system which includes at least two nodes and shared resources which in turn include at least two preselected shared devices;

a fault handling module (i) which corresponds to a selected one of the at least two nodes, (ii) which is operatively coupled to the fault detection module, and (iii) which is configured to perform the following steps when a fault condition is detected:
   attempting to reserve for the selected node all of the preselected shared devices, at least one of which is reserved by one of the at least two nodes other than the node of the fault handling module in the absence of a fault condition;
   causing a state of the selected node to specify that the selected node has exclusive access to the shared resources if the fault handling module succeeds in reserving all of the preselected shared devices; and
   causing the state of the selected node to specify that the selected node does not have exclusive access to the shared resources if the fault handler fails to reserve all of the preselected shared devices,
a fault handling module which is configured to perform the step of attempting by performing at least the following steps:
   attempting to reserve for the selected node a local shared device of the preselected shared devices; and
   forcibly reserving for the selected node at least one preselected shared device other than the local shared device if the fault handling module successfully reserves the local shared device.

* * * * *